(12) United States Patent
Vinski

(10) Patent No.: US 10,677,082 B2
(45) Date of Patent: Jun. 9, 2020

(54) AXIALLY COMPACT PRESSURIZED SEAL

(71) Applicant: PRATT & WHITNEY CANADA CORP., Longueuil (CA)

(72) Inventor: Johnny Vinski, Châteauguay (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 264 days.

(21) Appl. No.: 15/606,695

(22) Filed: May 26, 2017

(65) Prior Publication Data

US 2018/0340439 A1 Nov. 29, 2018

(51) Int. Cl.
F16H 15/44 (2006.01)
F01D 11/04 (2006.01)
(Continued)

(52) U.S. Cl.
CPC .............. *F01D 11/04* (2013.01); *F01D 25/16* (2013.01); *F01D 25/183* (2013.01); *F16J 15/002* (2013.01); *F16J 15/447* (2013.01); *F16J 15/4472* (2013.01); *F01D 25/18* (2013.01); *F05D 2220/30* (2013.01);
(Continued)

(58) Field of Classification Search
CPC ........ F16J 15/44; F16J 15/447; F16J 15/4472; F16J 15/4474; F16J 15/4476; F16J 15/4478; F16C 33/80; F02C 7/28
See application file for complete search history.

(56) References Cited

U.S. PATENT DOCUMENTS 3,910,651 A * 10/1975 Pearce .................. F01D 21/045
384/99
4,201,426 A * 5/1980 Garten ...................... F01D 5/06
384/563

(Continued)

FOREIGN PATENT DOCUMENTS

CN 107084244 10/2018
WO WO2017/198999 11/2017

*Primary Examiner* — Vishal A Patel
(74) *Attorney, Agent, or Firm* — Norton Rose Fulbright Canada LLP

(57) ABSTRACT

A seal assembly for a turbine engine having a shaft with a rotary axis and a housing surrounding the shaft; the seal assembly being disposed between the shaft and the housing, the seal assembly comprising: an outer labyrinth seal having multiple outer fins in opposing sealing engagement with a concentric outer seal runner, one of: the outer labyrinth seal fins; and the outer seal runner, engaging the housing, and the shaft engaging an opposing one of: the outer seal runner; and the outer labyrinth seal fins; an inner labyrinth seal, disposed radially inwardly concentric to and axially overlapping the outer labyrinth seal and the outer seal runner, the inner labyrinth seal having multiple inner fins in opposing sealing engagement with a concentric inner seal runner, one of: the inner labyrinth seal fins; and the inner seal runner, engaging the housing, and the shaft engaging an opposing one of: the inner seal runner; and the inner labyrinth seal fins; and an intermediate plenum, defined between the outer fins, the inner fins, the housing and the shaft, the intermediate plenum in communication with a source of compressed gas having a supply pressure greater than an ambient pressure external to the housing and greater than an internal pressure within the housing.

13 Claims, 2 Drawing Sheets

(51) Int. Cl.
  *F16J 15/00*    (2006.01)
  *F16J 15/447*   (2006.01)
  *F01D 25/16*    (2006.01)
  *F01D 25/18*    (2006.01)

(52) U.S. Cl.
  CPC ...... *F05D 2240/60* (2013.01); *F05D 2300/10* (2013.01); *F05D 2300/434* (2013.01); *F05D 2300/44* (2013.01)

(56) References Cited

U.S. PATENT DOCUMENTS

| | | | |
|---|---|---|---|
| 4,361,213 A * | 11/1982 | Landis, Jr. | F01D 11/02 188/378 |
| 5,211,535 A * | 5/1993 | Martin | F01D 11/02 277/413 |
| 5,733,103 A * | 3/1998 | Wallace | F01D 5/10 416/248 |
| 6,619,908 B2 | 9/2003 | Bruno et al. | |
| 7,175,388 B2 | 2/2007 | Labbe et al. | |
| 7,878,756 B2 | 2/2011 | Davis et al. | |
| 8,840,114 B2 | 9/2014 | Dixon et al. | |
| 9,022,390 B2 | 5/2015 | Amador | |
| 9,890,704 B2 * | 2/2018 | Speak | F02K 3/06 |
| 2016/0169040 A1 | 6/2016 | Anglin et al. | |
| 2017/0067397 A1 | 3/2017 | Fang et al. | |

* cited by examiner

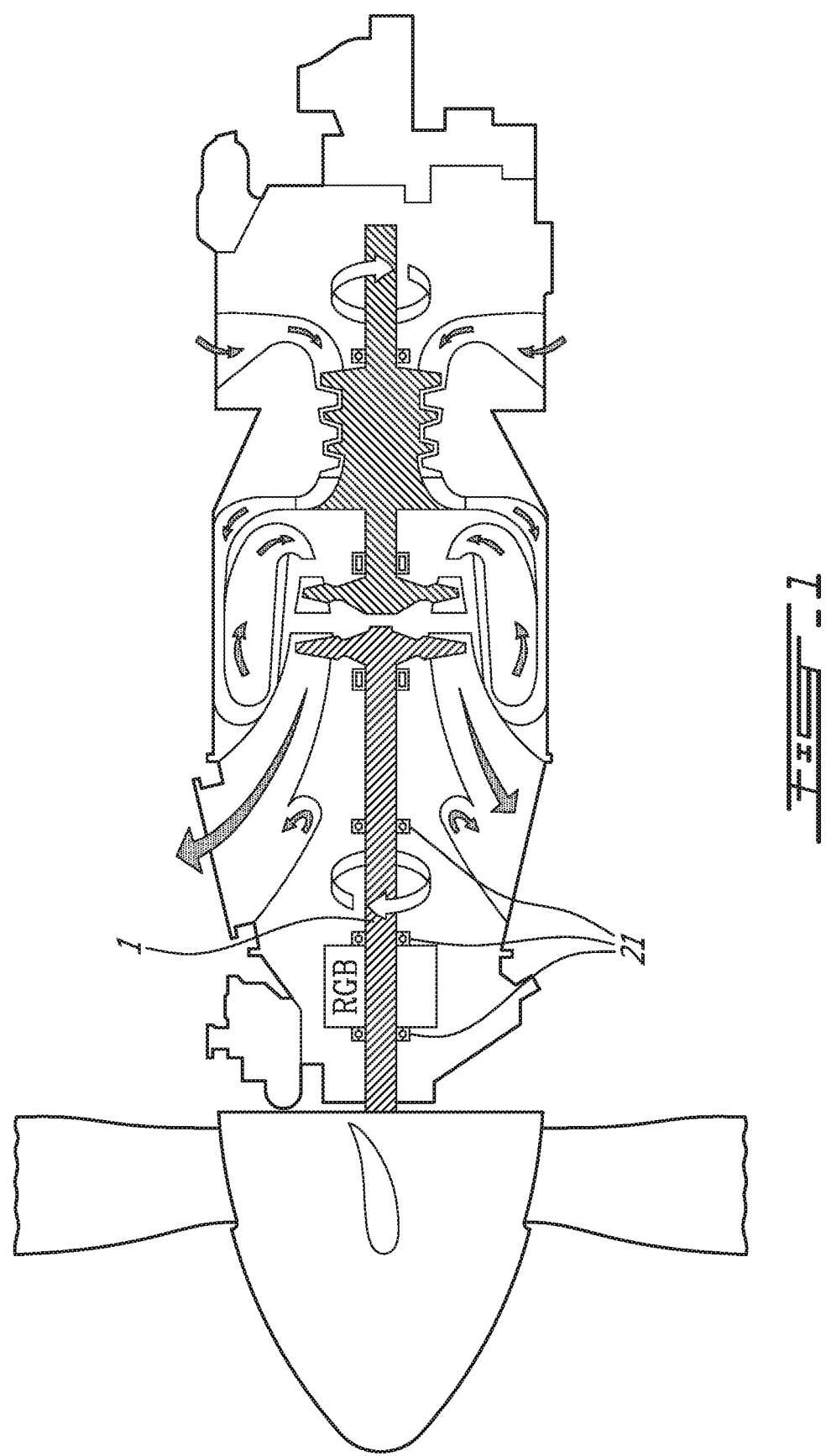

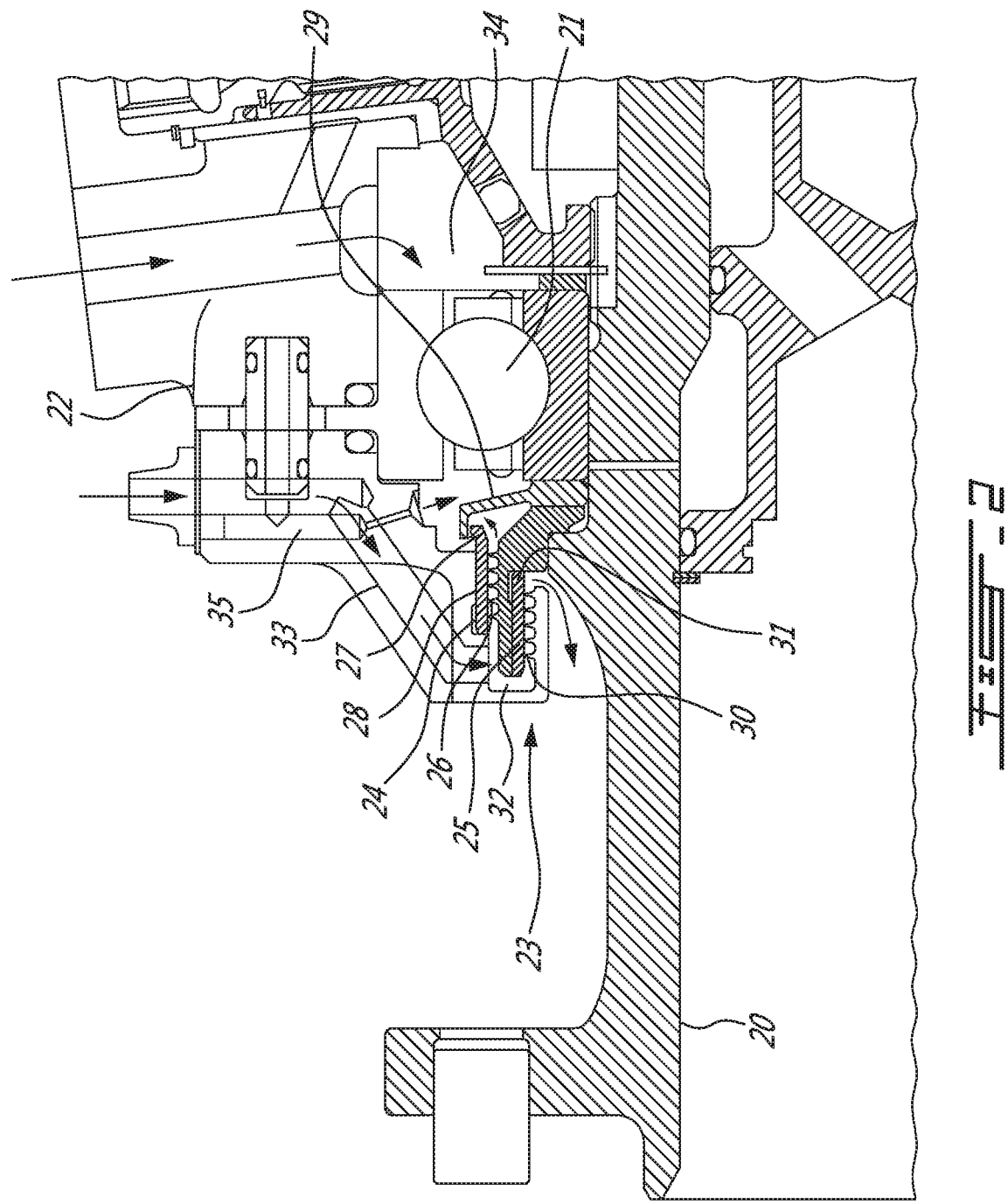

AXIALLY COMPACT PRESSURIZED SEAL

TECHNICAL FIELD

The disclosure relates generally to a gas turbine engine and, more particularly, to a pressurized seal between a static component and a rotating component.

BACKGROUND OF THE ART

The sealing of bearing housings about rotating shafts in a gas turbine engine serves to contain lubricants to cool and lubricate bearing components. Usually axially spaced apart dual seals are used between stationary bearing housings and rotating shafts that have an air plenum between the dual seals. The air plenum is pressurized with compressed air to purge the air plenum of lubricant egress from the bearing housing or ingress of air, liquid contaminants or particles while maintaining engagement between the seal and rotating shaft. At least a minimal clearance gap between stationary and rotating components in the seal area is required to enable assembly, however excessive gaps lead to inefficiencies due to leakage of compressed air from the plenum, leakage of lubricants or ingress of contaminants.

Carbon seals and labyrinth seals are commonly used for this purpose. Carbon seals are less robust and heavier than labyrinth seals in general. Multiple carbon seals are arranged axially along the shaft surface to improve seal performance consuming space axially thus elongating the engine. Carbon seals also add weight and mechanical complexity which are generally undesirable in gas turbine engines, such as aircraft engines.

SUMMARY

In one aspect, the disclosure describes a seal assembly, for a turbine engine having a shaft with a rotary axis and a housing surrounding the shaft; the seal assembly being disposed between the shaft and the housing, the seal assembly comprising: an outer labyrinth seal having multiple outer fins in opposing sealing engagement with a concentric outer seal runner, one of: the outer labyrinth seal fins; and the outer seal runner, engaging the housing, and the shaft engaging an opposing one of: the outer seal runner; and the outer labyrinth seal fins; an inner labyrinth seal, disposed radially inwardly concentric to and axially overlapping the outer labyrinth seal and the outer seal runner, the inner labyrinth seal having multiple inner fins in opposing sealing engagement with a concentric inner seal runner, one of: the inner labyrinth seal fins; and the inner seal runner, engaging the housing, and the shaft engaging an opposing one of: the inner seal runner; and the inner labyrinth seal fins; and an intermediate plenum, defined between the outer fins, the inner fins, the housing and the shaft, the intermediate plenum in communication with a source of compressed gas having a supply pressure greater than an ambient pressure external to the housing and greater than an internal pressure within the housing.

In a further aspect, the disclosure describes a turbine engine having a rotatable shaft with a rotary axis; a stationary housing surrounding the shaft; and a seal assembly disposed between the rotatable shaft and the stationary housing, the seal assembly comprising: an outer labyrinth seal having multiple outer fins in opposing sealing engagement with a concentric outer seal runner, an inner labyrinth seal, disposed radially inwardly concentric to and axially overlapping the outer labyrinth seal and the outer seal runner, the inner labyrinth seal having multiple inner fins in opposing sealing engagement with a concentric inner seal runner, an intermediate plenum, defined between the outer fins, the inner fins, the stationary housing and the rotatable shaft, the intermediate plenum in communication with a source of compressed gas having a supply pressure greater than an ambient pressure external to the stationary housing and greater than an internal pressure within the stationary housing.

In a further aspect, the disclosure describes a method of sealing a shaft with a rotary axis, and a housing surrounding the shaft of a turbine engine, the method comprising: providing a seal assembly between the shaft and the housing, the seal assembly comprising: an outer labyrinth seal having multiple outer fins in opposing sealing engagement with a concentric outer seal runner, one of: the outer labyrinth seal fins; and the outer seal runner, engaging the housing, and the shaft engaging an opposing one of: the outer seal runner; and the outer labyrinth seal fins; an inner labyrinth seal, disposed radially inwardly concentric to and axially overlapping the outer labyrinth seal and the outer seal runner, the inner labyrinth seal having multiple inner fins in opposing sealing engagement with a concentric inner seal runner, one of: the inner labyrinth seal fins; and the inner seal runner, engaging the housing, and the shaft engaging an opposing one of: the inner seal runner; and the inner labyrinth seal fins; and an intermediate plenum, defined between the outer fins, the inner fins, the housing and the shaft, supplying pressurized gas to the intermediate plenum from a source of compressed gas having a supply pressure greater than an ambient pressure external to the housing and greater than an internal pressure within the housing Embodiments may include combinations of the above features. Further details of these and other aspects of the subject matter of this application will be apparent from the detailed description included below and the drawings.

DESCRIPTION OF THE DRAWINGS

Reference is now made to the accompanying drawings, in which:

FIG. 1 is a schematic axial cross-sectional view through an exemplary turboprop gas turbine engine with an engine shaft and bearings; and FIG. 2 is a partial axial sectional view of an embodiment described below showing a forward edge of a stationary bearing housing with dual concentric and overlapping labyrinth seals engaging a rotating shaft (shown cross-hatched).

DETAILED DESCRIPTION

Aspects of various embodiments are described through reference to the drawings. FIG. 1 shows an axial cross-section through an example turboprop gas turbine engine. It will be understood that the invention is equally applicable to other types of turbine engines such as a turbo-shaft, turbo-fan, or auxiliary power units (APUs).

The low pressure (LP) shaft 1 is shown in FIG. 1 supported by bearing assemblies 21 for rotation about the central axis relative to the stationary bearing housings. The LP shaft 1 may be composed of several shaft segments and may include an output shaft segment 20 (FIG. 2) connected to an outlet end of a reduction gear box (RGB) for transferring a torque to a rotatable load (a propeller in the illustrated example).

FIG. 2 shows an embodiment disclosed herein for a dual labyrinth seal assembly suitable for use as an output shaft seal. The output shaft 20 is supported by bearings 21 rotating about a rotary axis with a stationary bearing housing 22 surrounding the shaft 20. The dual labyrinth seal assembly 23 is disposed between the shaft 20 and the bearing housing 22.

The seal assembly 23 includes a radially outer labyrinth seal 24 and an inner labyrinth seal 25 that are coaxial and overlap axially. An advantage of the overlap arrangement is that axial space is reduced. The outer labyrinth seal 24 has multiple outer fins 26 mounted to the rotating shaft 20 in opposing sealing engagement with a stationary concentric outer seal runner 28 mounted to the bearing housing 22. In the embodiment shown the outer seal runner 28 includes a drip lip 27 that interacts with an oil slinger 29 mounted on the rotating shaft 20. Of course the mounting of the fins 26 and runner 28 could be reversed. Stated generally one of: the outer labyrinth seal fins 26; and the outer seal runner 28, engage the bearing housing 22, and the shaft 20 engages the opposite one of: the outer seal runner 28; and the outer labyrinth seal fins 26.

The inner labyrinth seal 25 is located radially inwardly concentric to and axially overlapping the outer labyrinth seal 24 and the outer seal runner 28. The inner labyrinth seal 25 has multiple inner fins 30 in opposing sealing engagement with a concentric inner seal runner 31. Again the mounting of the fins 30 and runner 31 could be reversed. Stated generally one of: the inner labyrinth seal fins 30; and the inner seal runner 31, engages the bearing housing 22, and the shaft 20 engages the opposing inner seal runner 31 or the inner labyrinth seal fins 30 as the case may be.

An intermediate plenum 32 is defined between the outer fins 26, the inner fins 30, the housing 22 and the shaft 20 to receive pressurized gas via the flow channel 33 from a source of compressed gas. The supply pressure is greater than an ambient pressure external to the housing 22 and greater than an internal pressure within the housing 22. The result is that the plenum 32 is continually purged, contaminants from outside the housing 22 are impeded from migrating into the housing 22, and lubricant with the housing 22 is impeded from escaping.

For durability the outer labyrinth fins 26 and inner labyrinth fins 30 are made of metal. The outer seal runner 28 and the inner seal runner 31 are made of one of durable heat tolerant plastic which can be molded or machined. The gap between the runners 28, 31 and labyrinth fins 26, 30 can be optimized to be minimal by machining the metal labyrinth fins 26, 30 and machining the plastic runners 28, 31 since only an assembly tolerance is needed. A suitable plastic is sold under the trademark Meldin™ by St. Gobain Performance Plastics Corp. Meldin™ is described as a thermosetting polyimide resin and when used for bearings or lubricated applications as thermosetting polyimide resin combined with particles of a self-lubricating filler selected from the group consisting of: graphite filler; and molybdenum disulfide filler.

The fact that the Meldin seal runner can be abraded and the particles do not affect the bearings or other components in the bearing cavity enables the optimization of the operating seal clearance. The initial clearance is minimized to enable assembly. In operation, the fins will abrade into the seal runner creating the running clearance. This will ensure an optimized running clearance. Alternatively, the outer seal runner 28 and the inner seal runner 31 can be simply manufactured with a cylindrical inner surface and grooves can be abraded into the surface by the inner and outer labyrinth fins 26, 30 after assembly or during operation.

In the embodiment illustrated in FIG. 2, the outer seal runner 28 is mounted to the bearing housing 22 and the outer seal runner 28 includes a drip lip 27 extending into the housing 22. The shaft 20 includes a lubricant slinger 29 disposed radially outward of the drip lip 27 to impede escape of lubricant and recirculate lubricant in the housing 22. The bearing housing 22 has an interior chamber 34 surrounding bearings 21 in communication with a source of liquid lubricant via a supply channel 35.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is also intended to cover and embrace all suitable changes in technology. Modifications which fall within the scope of the present invention will be apparent to those skilled in the art, in light of a review of this disclosure, and such modifications are intended to fall within the appended claims. For instance, the fins of the inner and outer labyrinth seals could be both on the rotating component (e.g. the shaft). Also, the scope of the claims should not be limited by the preferred embodiments set forth in the examples, but should be given the broadest interpretation consistent with the description as a whole.

What is claimed is:

1. A turbine engine having a rotatable shaft with a rotary axis; a stationary housing surrounding the shaft; and a seal assembly disposed between the rotatable shaft and the stationary housing, the seal assembly comprising:
   an outer labyrinth seal having multiple outer fins secured to the shaft and in opposing sealing engagement with a concentric outer seal runner secured to the housing,
   an inner labyrinth seal, disposed radially inwardly concentric to and axially overlapping the outer labyrinth seal and the outer seal runner, the inner labyrinth seal having multiple inner fins secured to the housing and in opposing sealing engagement with a concentric inner seal runner secured to the shaft,
   an intermediate plenum, defined between the outer fins, the inner fins, the stationary housing and the rotatable shaft, the intermediate plenum in communication with a source of compressed gas having a supply pressure greater than an ambient pressure external to the stationary housing and greater than an internal pressure within the stationary housing.

2. The turbine engine of claim 1, wherein the outer fins and inner fins are made of metal.

3. The turbine engine of claim 2, wherein the outer seal runner and the inner seal runner are made of one of: plastic; thermosetting polyimide resin; and thermosetting polyimide resin combined with particles of a self-lubricating filler selected from the group consisting of: graphite filler; and molybdenum disulfide filler.

4. The turbine engine of claim 3, wherein the outer and inner fins are positioned to abrade into the outer seal runner and the inner seal runner, respectively.

5. The turbine engine of claim 1, wherein the outer seal runner is mounted to the stationary housing, the outer seal runner includes a drip lip extending into the stationary housing, and wherein the rotatable shaft includes a lubricant slinger disposed radially outward of the drip lip.

6. The turbine engine of claim 1, wherein the stationary housing has an interior chamber surrounding bearings rotatably mounted to the shaft, the interior chamber in communication with a source of liquid lubricant.

7. A method of sealing a shaft with a rotary axis, and a housing surrounding the shaft of a turbine engine, the method comprising:
 providing a seal assembly between the shaft and the housing, the seal assembly comprising:
  a first labyrinth seal having first fins in opposing sealing engagement with a first seal runner, the first fins secured to the housing, the first seal runner secured to the shaft;
  a second labyrinth seal radially offset from the first labyrinth seal and axially overlapping the first labyrinth seal, the second labyrinth seal having second fins in opposing sealing engagement with a second seal runner, the second fins secured to the shaft, the second seal runner secured to the housing; and
  an intermediate plenum, defined between the first fins, the second fins, the housing and the shaft, the intermediate plenum in communication with a source of compressed gas having a supply pressure greater than an ambient pressure external to the housing and greater than an internal pressure within the housing, and
 supplying pressurized gas to the intermediate plenum from the source of compressed gas having the supply pressure greater than the ambient pressure external to the housing and greater than the internal pressure within the housing.

8. The method of claim 7, wherein the first fins and the second fins are made of metal.

9. The method of claim 8, wherein the first seal runner and the second seal runner are made of one of: plastic; thermosetting polyimide resin; and thermosetting polyimide resin combined with particles of a self-lubricating filler selected from the group consisting of: graphite filler; and molybdenum disulfide filler.

10. The method of claim 9, comprising: allowing the first fins and the second fins to abrade into the first seal runner and the second seal runner, respectively.

11. The method of claim 7, wherein the first seal runner is mounted to the housing, the first seal runner includes a drip lip extending into the housing, and wherein the shaft includes a lubricant slinger disposed radially outward of the drip lip.

12. The method of claim 7, wherein the housing has an interior chamber surrounding bearings rotatably mounted to the shaft, the method comprising providing the interior chamber with a flow of liquid lubricant.

13. The seal assembly of claim 7, wherein the first labyrinth seal is located radially outwardly of the second labyrinth seal relative to a rotary axis of the shaft.

* * * * *